United States Patent
Polton (10) Patent No.: US 12,487,798 B2
(45) Date of Patent: Dec. 2, 2025

(54) SYSTEM AND METHOD FOR AUTOMATED GENERATED SOFTWARE FROM TESTS

(71) Applicant: JPMorgan Chase Bank, N.A., New York, NY (US)

(72) Inventor: Richard Polton, Shaftesbury (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 322 days.

(21) Appl. No.: 18/136,528

(22) Filed: Apr. 19, 2023

(65) Prior Publication Data

US 2024/0354069 A1   Oct. 24, 2024

(51) Int. Cl.
*G06F 8/35* (2018.01)
*G06F 8/41* (2018.01)

(52) U.S. Cl.
CPC ............ *G06F 8/35* (2013.01); *G06F 8/427* (2013.01)

(58) Field of Classification Search
CPC ............ G06F 8/30; G06F 8/35; G06F 8/427
See application file for complete search history.

(56) References Cited

U.S. PATENT DOCUMENTS

2012/0102458 A1*  4/2012  Meijer ............... G06F 8/73
                                         717/123
2024/0020116 A1*  1/2024  Chen ................ G06N 3/08

OTHER PUBLICATIONS

Polton, Richard, "Testing times Richard Polton looks at unit tests from a different perspective", Features {cvu}, Sep. 2013.
Polton, Richard, "Generating Code From a Unit Test, Part the Second Richard Polton continues his quest to generate code from tests", Features {cvu}, Nov. 2013.
Polton, Richard, "Generating Code from a Unit Test (Part 3) Richard Polton generates the code to pass his unit tests", Features {cvu}, Jan. 2014.

* cited by examiner

*Primary Examiner* — Hanh Thi-Minh Bui
(74) *Attorney, Agent, or Firm* — GREENBLUM AND BERNSTEIN, P.L.C.

(57) ABSTRACT

A method and system for generating an application code from an inputted test code are disclosed. The method includes receiving one or more sets of test code; analyzing and parsing the one or more sets of test code; extracting at least one feature from the parsed one or more sets of test code; determining an execution context of the one or more sets of test code; and determining whether a seed code is included in the execution context. The method further discloses that, when the seed code is determined to be included in the execution context, generating an application code onto the seed code. The method alternatively discloses that, when the seed code is determined to be absent in the execution context, generating the application code. When the application code is generated, the method discloses applying the application code onto the one or more sets of test code.

16 Claims, 8 Drawing Sheets

```
1   Feature: automatically generate code given unit tests that describe how the application should behave
2
3   Scenario: run a test when the context contains the class code
4     Given a unit test
5     """
6     class ATest {
7       @Test
8       void test() {
9         new A();
10      }
11    }
12    """
13    And an execution context containing the class definition
14    """
15    public class A { }
16    """
17    When the test is run in the supplied context
18    Then the test should execute without errors
19
20  Scenario: run a test when the context does not contain the class code, so we have to generate it and add it to the context
21    Given a unit test
22    """
23    class ATest {
24      @Test
25      void test() {
26        new A();
27      }
28    }
29    """
30    And an empty execution context
31    When the test is run in the supplied context
32    Then the application should generate code
33    """
34    public class A { }
35    """
36    And the test should execute without errors
```

SYSTEM AND METHOD FOR AUTOMATED GENERATED SOFTWARE FROM TESTS

TECHNICAL FIELD

This disclosure generally relates to a system and method for automatically generating software code from one or more tests. More specifically, the present disclosure is directed to automating repetitive task of producing application code from unit and integration tests.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Test-Driven Development or Test-Driven Design (TDD) is the process of building a software application that is robust and reproducibly correct (i.e., an application that is known to satisfy its acceptance criteria from the very start of the process). Developers are employed to write these tests and then, having written the tests, to produce an application that satisfies these tests. However, many of the steps taken in the generation of application code are repetitive and amenable to automation. Developer-time is expensive, and there is a global shortage of skilled people and there is a massive backlog of unimplemented requirements that have to be performed manually instead by an automated process.

Further, conventional TDD requires generation of all types of scenarios to be built out requiring heaving computing utilization (e.g., CPU, memory and etc.), rendering the TDD process difficult to be utilized and impractical due to heavy expenditure of computing resources.

SUMMARY

According to an aspect of the present disclosure, a method for generating an application code from an inputted test code is provided. The method includes receiving, by a processor, one or more sets of test code: analyzing and parsing, by the processor, the one or more sets of test code: extracting, by the processor, at least one feature from the parsed one or more sets of test code: determining, by the processor, an execution context of the one or more sets of test code: determining, by the processor, whether a seed code is included in the execution context: when the seed code is determined to be included in the execution context, generating an application code onto the seed code: when the seed code is determined to be absent in the execution context, generating the application code; and applying, by the processor, the application code onto the one or more sets of test code.

According to another aspect of the present disclosure, the one or more sets of test codes include at least one of a unit test code, a system test code or an integration test code.

According to another aspect of the present disclosure, the at least one feature includes an interface.

According to yet another aspect of the present disclosure, the seed code is a class definition.

According to another aspect of the present disclosure, the method further includes when the seed code is determined to be absent in the execution context, generating a class definition based on the received test code, in which the class definition is generated by the processor separately from the generating of the application code.

According to a further aspect of the present disclosure, the application is generated using the class definition that is generated.

According to yet another aspect of the present disclosure, the method further includes determining whether the applying of the application code onto the one or more sets of test code results in an error or not.

According to a further aspect of the present disclosure, a result of the determining is inputted into a machine learning model, and the machine learning model is modified based on the result of the determining for subsequent processing of the inputted test code.

According to another aspect of the present disclosure, the analyzing and parsing of the one or more sets of the test code is performed using a machine learning model.

According to a further aspect of the present disclosure, the parsing includes generating a syntax tree including a plurality of nodes: querying of the syntax tree and extracting one or more syntax nodes; and creating a semantics model for identification of the at least one feature.

According to a further aspect of the present disclosure, the at least one feature identified includes an interface that is mocked in the one or more test codes.

According to a further aspect of the present disclosure, when the seed code is determined to be absent in the execution context, creating a class definition by creating another data structure keyed to the syntax tree: inserting one or more assertion attribute to the other data structure; and attaching an attribute list to each interface function extracted from the parsed one or more sets of test code.

According to a further aspect of the present disclosure, the at least one feature is mocked in the one or more sets of test code.

According to a further aspect of the present disclosure, the execution context indicates an inclusion of the seed code.

According to a further aspect of the present disclosure, the execution context indicates an inclusion of a class definition.

According to a further aspect of the present disclosure, the execution context is determined to be an empty execution context.

According to a further aspect of the present disclosure, the application code to be generated is dictated by the seed code.

According to a further aspect of the present disclosure, the at least one feature extracted from the one or more sets of test code is stored in a dictionary database, and in which the application code is generated using the dictionary database and a machine learning algorithm.

According to another aspect of the present disclosure, a non-transitory computer readable storage medium that stores a computer program for generating an application code from an inputted test code is provided. The computer program, when executed by a processor, causes a system to perform multiple processes including: receiving one or more sets of test code: analyzing and parsing the one or more sets of test code; extracting at least one feature from the parsed one or more sets of test code: determining an execution context of the one or more sets of test code: determining whether a seed code is included in the execution context: when the seed code is determined to be included in the execution context, generating an application code onto the seed code: when the seed code is determined to be absent in the execution context, generating the application code; and applying the application code onto the one or more sets of test code.

According to an aspect of the present disclosure, a system to provide for generating an application code from an inputted test code is provided. The system includes a memory, a display and a processor. The processor is configured to perform: receiving one or more sets of test code; analyzing and parsing the one or more sets of test code; extracting at least one feature from the parsed one or more sets of test code; determining an execution context of the one or more sets of test code; determining whether a seed code is included in the execution context; when the seed code is determined to be included in the execution context, generating an application code onto the seed code; when the seed code is determined to be absent in the execution context, generating the application code; and applying the application code onto the one or more sets of test code.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
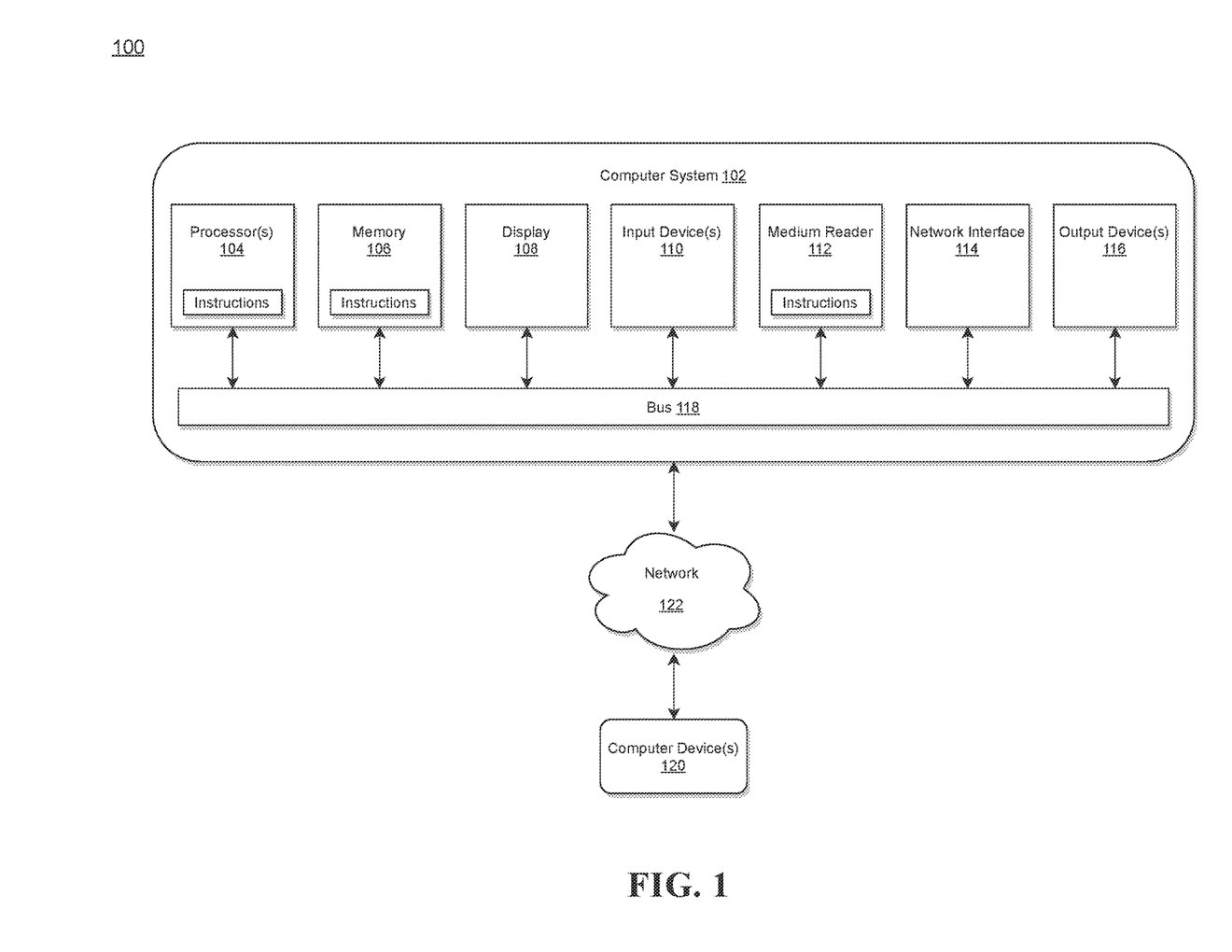
FIG. 1 illustrates a computer system for implementing a test code based automated code generating (TCBACG) system in accordance with an exemplary embodiment.

FIG. 1 illustrates a computer system for implementing a test code based automated code generating (TCBACG) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
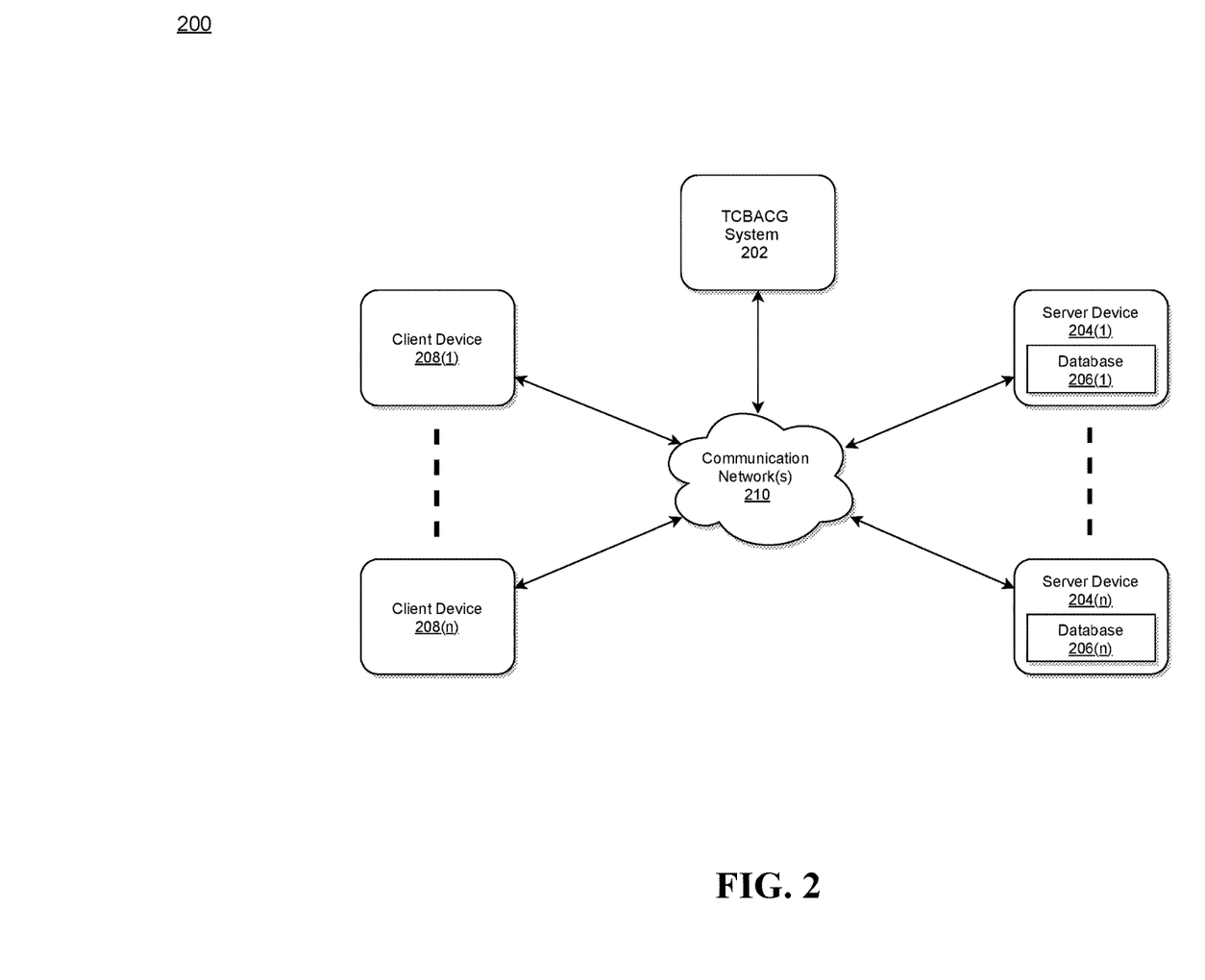
FIG. 2 illustrates an exemplary diagram of a network environment with a TCBACG system in accordance with an exemplary embodiment.

FIG. 2 illustrates an exemplary diagram of a network environment with a TCBACG system in accordance with an exemplary embodiment.

A test code based automated code generating (TCBACG) system 202 may be implemented with one or more computer systems similar to the computer system 102 as described with respect to FIG. 1.

The TCBACG system 202 may store one or more applications that can include executable instructions that, when executed by the TCBACG system 202, cause the TCBACG system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the TCBACG system 202 itself, may be located in virtual server(s) running in a cloud-based computing environment rather than being tied to one or more specific physical network computing devices. Also, the application(s) may be running in one or more virtual machines (VMs) executing on the TCBACG system 202. Additionally, in one or more embodiments of this technology, virtual machine(s) running on the TCBACG system 202 may be managed or supervised by a hypervisor.

In the network environment 200 of FIG. 2, the TCBACG system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the TCBACG system 202, such as the network interface 114 of the computer system 102 of FIG. 1, operatively couples and communicates between the TCBACG system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TCBACG system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TCBACG system 202 may be a standalone device or integrated with one or more other devices or apparatuses, such as one or more of the server devices 204(1)-204(n), for example. In one particular example, the TCBACG system 202 may be hosted by one of the server devices 204(1)-204(n), and other arrangements are also possible. Moreover, one or more of the devices of the TCBACG system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TCBACG system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the TCBACG system 202 that may efficiently provide a platform for implementing a cloud native TCBACG system module, but the disclosure is not limited thereto.

The client devices 208(1)-208(n) may run interface applications, such as standard web browsers or standalone client applications, which may provide an interface to communicate with the TCBACG system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the TCBACG system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TCBACG system 202, the server devices 204(1)-204(n), or the client devices 208(1)-208(n), for example, may be configured to operate as virtual instances on the same physical machine. For example, one or more of the TCBACG system 202, the server devices 204(1)-204(n), or the client devices 208(1)-208(n) may operate on the same physical device rather than as separate devices communicating through communication network(s) 210. Additionally, there may be more or fewer TCBACG system 202, server devices 204(1)-204(n), or client devices 208(1)-208(n) than illustrated in FIG. 2. According to exemplary embodiments, the TCBACG system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
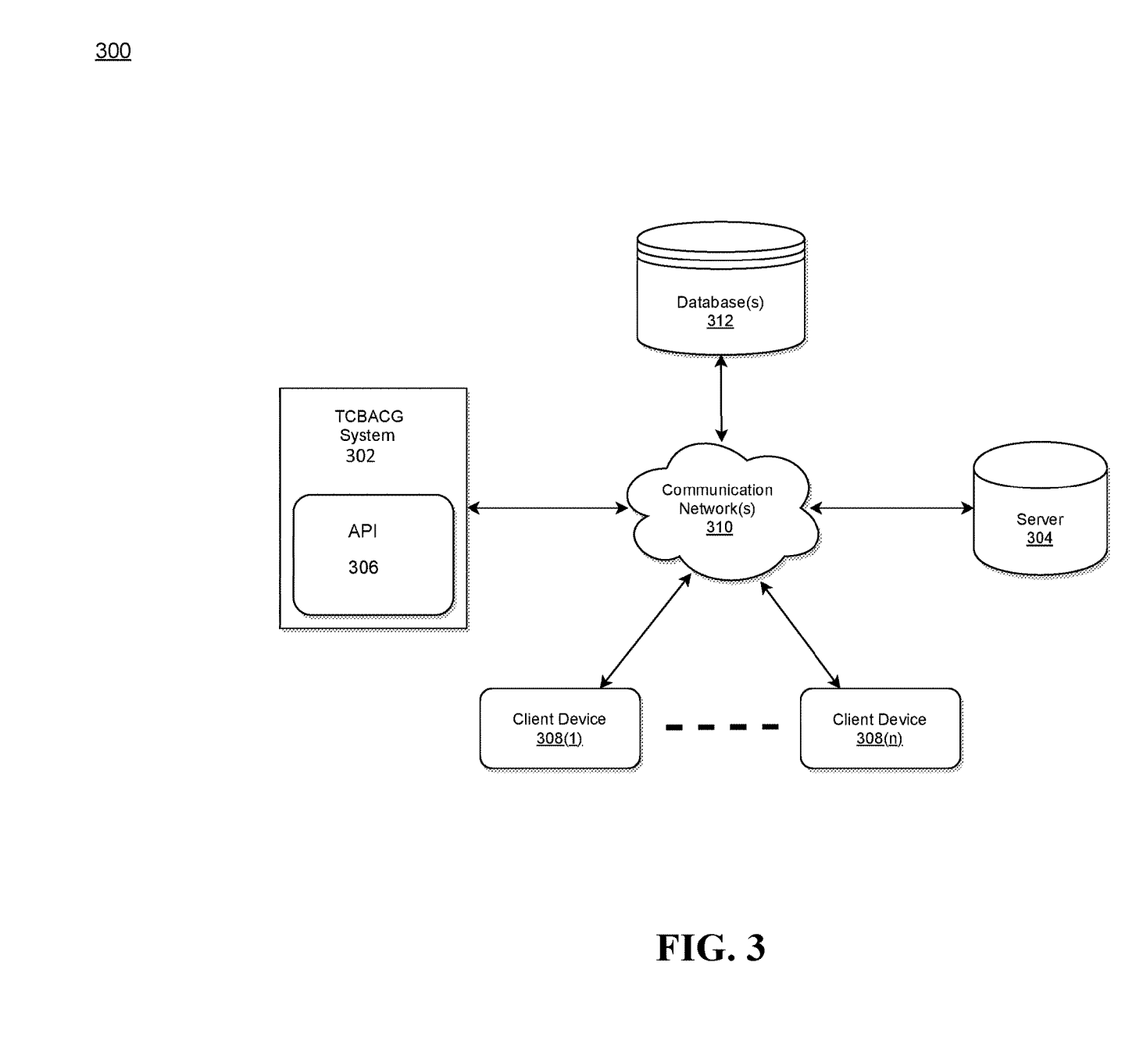
FIG. 3 illustrates a system diagram for implementing a TCBACG system in accordance with an exemplary embodiment.

FIG. 3 illustrates a system diagram for implementing a TCBACG system in accordance with an exemplary embodiment.

As illustrated in FIG. 3, the system 300 may include an TCBACG system 302 within which a group of API modules 306 is embedded, a server 304, a database(s) 312, a plurality of client devices 308(1) . . . 308(n), and a communication network 310.

According to exemplary embodiments, the TCBACG system 302 including the API modules 306 may be connected to the server 304, and the database(s) 312 via the communication network 310. Although there is only one database that has been illustrated, the disclosure is not limited thereto. Any number of databases may be utilized. The TCBACG system 302 may also be connected to the plurality of client devices 308(1) . . . 308(n) via the communication network 310, but the disclosure is not limited thereto.

According to exemplary embodiment the TCBACG system 302 is described and shown in FIG. 3 as including the API modules 306, although it may include other rules, policies, modules, databases, or applications, for example. According to exemplary embodiments, the database(s) 312 may be embedded within the TCBACG system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable TCBACG system as a service for a desired data processing scheme. The UI platform may include an input interface layer and an output interface layer. The input interface layer may request preset input fields to be provided by a user in accordance with a selection of an automation template. The UI platform may receive user input via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the TCBACG system 302. In this regard, the plurality of client devices 308(1) . . . 308(n) may be "clients" of the TCBACG system 302 and are described herein as such. Nevertheless, it is to be known and understood that the plurality of client devices 308(1) . . . 308(n) need not necessarily be "clients" of the TCBACG system 302, or any entity described in association therewith herein. Any additional or alternative relationship may exist between either or both of the plurality of client devices 308(1) . . . 308(n) and the TCBACG system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the TCBACG system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The TCBACG system 302 may be the same or similar to the TCBACG system 202 as described with respect to FIG. 2, including any features or combination of features described with respect thereto.

Figure 4:
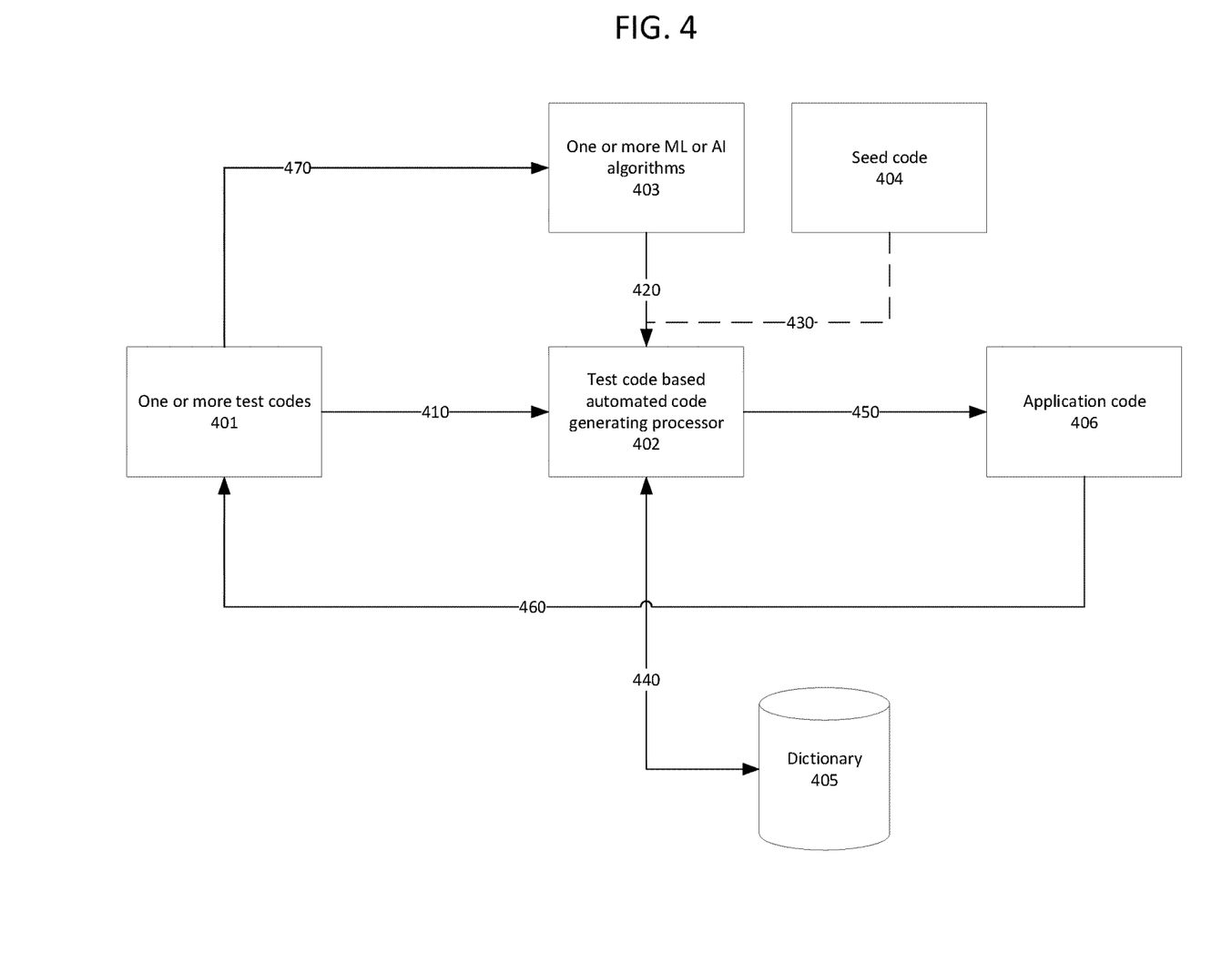
FIG. 4 illustrates a system flow of a TCBACG system in accordance with an exemplary embodiment.

FIG. 4 illustrates a system flow of a TCBACG system in accordance with an exemplary embodiment.

According to exemplary aspects, the TCBACG system may include one or more test codes 401, a test code based automated code generating processor 402, one or more machine learning (ML) or artificial intelligence (AI) algorithms 403, a seed code 404, a dictionary database 405, and an application code 406. However, aspects of the present disclosure are not limited thereto, such that the TCBACG system may include more or less of the enumerated components exemplarily illustrated in FIG. 4.

According to exemplary aspects, the test code based automated code generating processor 402 may receive one or more test codes 401 as input in operation 410. In an example, the one or more test codes 401 may include, without limitation, a unit test, a system test and/or an integration test According to exemplary aspects, the tests may be provided as a string, a file or any other suitable form. In an example, a test code may indicate an interface, a function on the respective interface, a class, expected return value type, one or more parameters, expected values or range of values and the like.

The TCBACG processor 402 may then perform various processing on the received test codes. In an example, one or more processing may include, without limitation, parsing of test codes and extracting of various features from the parsed test codes. Extracted features may include one or more interfaces, classes, functions, maxima, minima, ranges of values and the like. Moreover, the TCBACG processor 402 may perform the above-described operations in accordance with a static algorithm that may be intermittently updated, or using one or more machine learning (ML) or artificial intelligence (AI) algorithms 403, which may be provided to the TCBACG processor 402 in operation 420.

In an example, AI or ML algorithms may be executed to perform data pattern detection, and to provide an output based on the data pattern detection. More specifically, an output may be provided based on a historical pattern of data such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment the ML or AI models may be generated using at least one from among an artificial neural network technique, a decision tree technique, a support vector machines technique, a Bayesian network technique, and a genetic algorithms technique.

Further, TCBACG processor 402 may additionally or optionally receive one or more seed code 404, such as a class code or definition, in operation 430. In an example, test code may include a seed code that may be extracted out or derived from the parsed tested code. However, aspects of the present disclosure are not limited thereto, where certain features may be extracted or derived from the test codes 401, but some may not be and may be provided from an external source.

In addition to the above, the TCBACG processor 402 may store the extracted interfaces, classes, variables, range of values and the like into a dictionary database 405 in operation 440. In an example, the extracted features or information may be associated with one another. Alternatively, the extracted features or information may be independently stored and associated by one or more ML or AI algorithms.

The stored information may then be later utilized for supplementing the application code generating process by the TCBACG processor 402.

The TCBACG processor 402, using the processed test codes, one or more ML or AI algorithms or static algorithm 403, and the seed code 404, which may be optionally provided, an application code 406 may be generated in operation 450.

The generated application code 406 may then be applied to the one or more test codes 401 in operation 460 for determining whether the generation code 406 satisfies the tests. In operation 470, information utilized in generating and testing the application code 406 may be provided to the one or more ML or AI algorithms 403 for further training or modifying the stored ML or AI algorithms, such that the modified ML or AI algorithms may more quickly or more efficiently leverage information from the dictionary database 405 and/or generate application code based on the inputted test codes.

Figure 5:
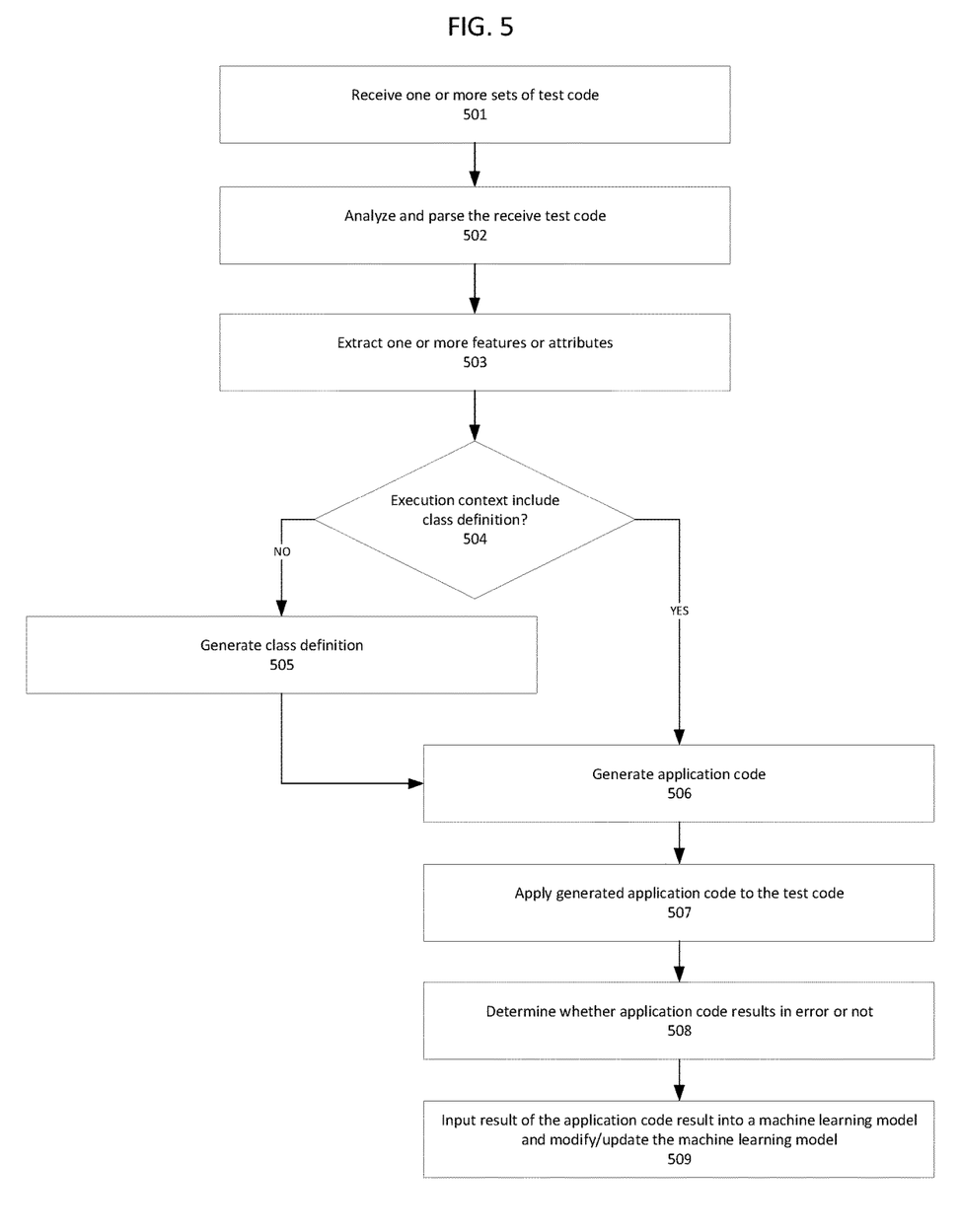
FIG. 5 illustrates a method for automatically generating an application code based on inputted test code in accordance with an exemplary embodiment.

FIG. 5 illustrates a method for automatically generating an application code based on inputted test code in accordance with an exemplary embodiment.

In operation 501, the TCBACG system receives one or more sets of test code as input for generating an application code. In an example, one or more sets of test code may include unit test, system test and integration test and the like. According to exemplary aspects, the one or more sets of test code may be provided as a string, a file or other suitable form for further processing.

In operation 502, the received test code may then be analyzed and parsed. According to exemplary aspects, parsing operation may be performed by one or more machine learning algorithms or by a separate parsing algorithm. The parsing operation may be performed on the test code to form a syntax tree. An exemplary method for parsing of test code for extraction of a mocked interface is provided in FIG. 6 and described in more detail below.

Figure 6:
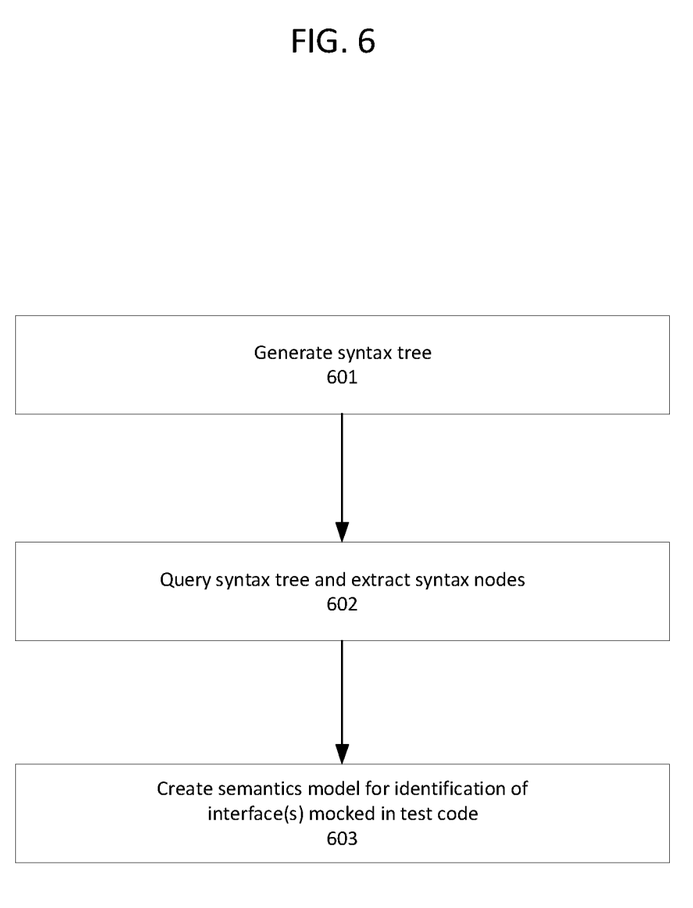
FIG. 6 illustrates a method for parsing of test code for extraction of a mocked interface in accordance with an exemplary embodiment.

In operation 601, a syntax tree is generated based on the received test code. According to exemplary aspects, a syntax tree may provide structural details of the test code and represented as interconnected nodes. Further, each of the nodes of the syntax tree may be associated with an attribute.

Subsequently, in operation 602, the syntax tree may be queried for extracting relevant nodes from the syntax tree. In an example, a path-based query may be performed on the syntax tree to extract out all of the syntax nodes corresponding to a test attribute among a list of attributes. Once relevant nodes are identified, one or more features being mocked in the test code may be identified for extraction.

In operation 603, a semantics data model may be generated based on the extracted nodes, which may then be utilized for identification of one or more interface(s) (or other extracted features) that may be referenced or mocked in the test code.

Although the parsing operation has been described with respect to a syntax tree, aspects of the present disclosure are not limited thereto, such that parsing operation may be formed without generating the syntax tree.

Referring back to FIG. 5, in operation 503, one or more features or attributes may be extracted from the parsed test code. According to exemplary aspects, the parsed test code may include at least one of an interface, a class, a function, an expected return value type, one or more parameters, expected values or range of values and the like. In an example, the extracted features may be associated with one another and stored in a database to serve as a library, which may be utilized in test cases having similar features.

In operation 504, the parsed test code is evaluated to determine an execution context for the text code and whether the execution context includes a seed code, such as a class definition, which may be utilized to create objects sharing common properties and/or methods. According to exemplary aspects, the seed code may refer to a building component of the application code, on which additional code may be built upon for generating an application code. Although the class definition was referred to as the seed code in the method of FIG. 5, aspects of the present disclosure are not limited thereto, such that other features, attributes or definitions may serve as the seed code. Further, based on the execution context and/or extracted features, one or more related features may be retrieved from a dictionary database.

If the execution context is determined to include a seed code, such as the class definition, in operation 504 of FIG. 5, the method proceeds to operation 506 where the TCBACG system generates an application code onto or using the seed code. For example, the seed code may dictate objects, values and/or other attributes to be generated for the application code. Accordingly, application code generation may be performed much more efficiently and quickly as unnecessary attributes, values and the like will be omitted from unnecessary generation or subsequent testing, thereby leading to technical resource (e.g., CPU resources, memory resources and the like) savings.

On the other hand, if the execution context is determined not to include a seed code in operation 504, the TCBACG system may generate an application code from scratch based on the features that are extracted or derived from the parsed test code. The generation of the application code may begin with first generating a class definition in operation 505. Once the class definition is generated in operation 505, an application code may be generated onto or using the generated class definition.

According to exemplary aspects, the parsed test code may include all of the features that may be required for generating an application code. However, aspects of the present disclosure are not limited thereto, such that limited features may be included, and remaining features may be derived using the extracted features of the test code. In an example, if an interface feature is extracted from the parse test code, a class feature may be generated or derived from the interface feature. An exemplary method for automatically generating a class code for test code-based application code is provided in FIG. 7 and described in more detail below.

Figure 7:
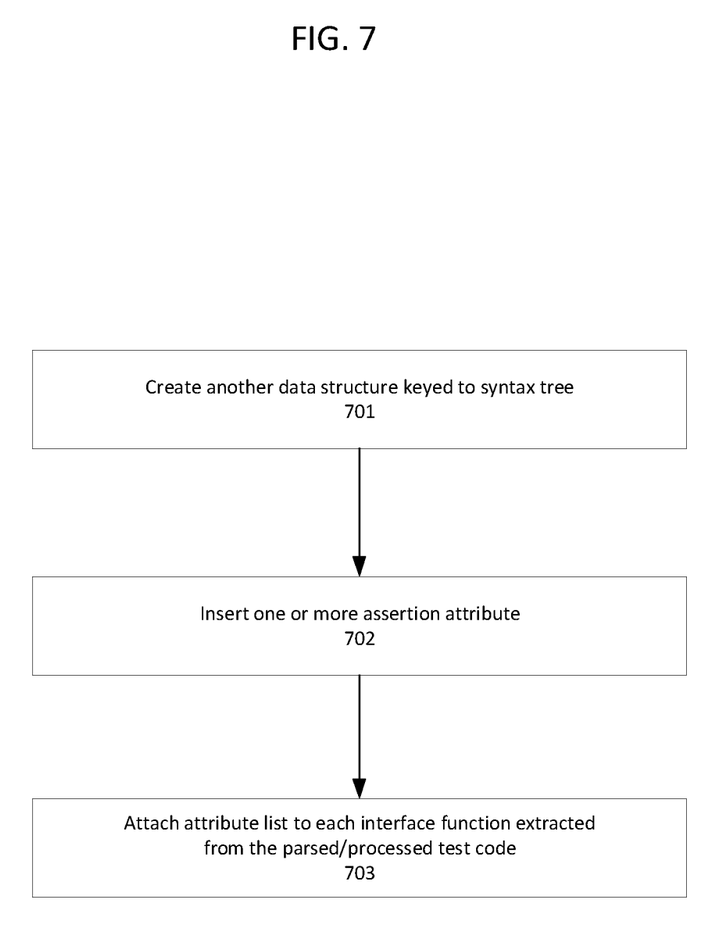
FIG. 7 illustrates a method for automatically generating a class code for test code-based application code generation in accordance with an exemplary embodiment.

In operation 701, another data structure keyed to the syntax tree may be generated. The other data structure may further include additional information, such as comments, attributes or the like.

In operation 702, one or more attribute assertions may be inserted. For example, attribute assertion may be an expression associated with a function, such as an interface function, being investigated or extracted from the test code. According to exemplary aspects, the test code may include one or more functions that may be extracted or derived.

In operation 703, one or more attribute list may be attached to each interface function extracted from the parsed test code.

Referring back to FIG. 5, in operation 507, the generated application code is then applied to the test code inputted in operation 501 to determine whether the generated application code satisfies the test code (e.g., generation of errors below a predetermined threshold) in operation 508. If the generated application code is determined to satisfy the test code in operation 508, result of the application generation based on the test code may be fed back into one or more ML or AI algorithm for updating thereof in operation 509. On the other hand, if the generated application code is determined not to satisfy the test code in operation 508, the generated application code may be further analyzed to determine causes of the incurred error(s) and fixed. Results of such errors and resulting fixes may also be fed back into the one or more ML or AI algorithms for updating thereof in operation 509, for better recognition of such test code input for more accurate response in a subsequent iteration.

Figure 8:
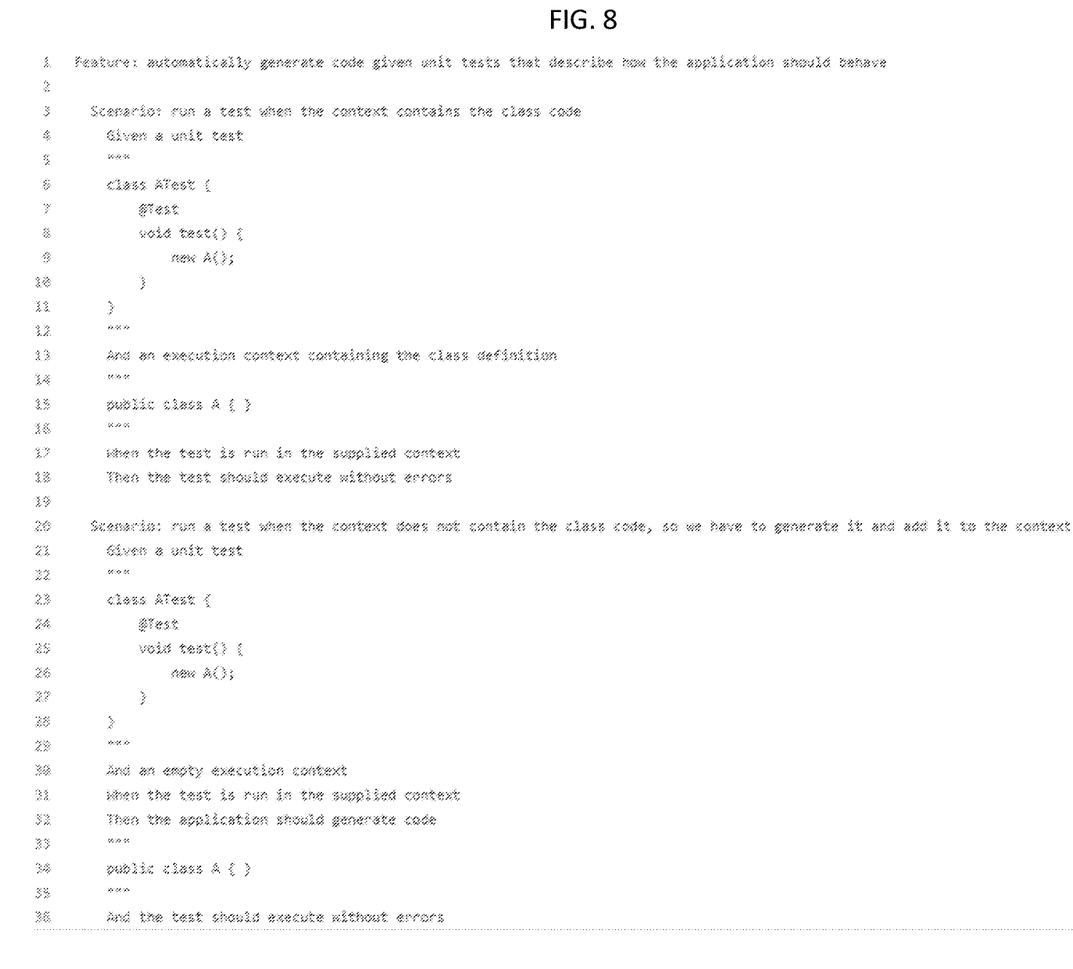
FIG. 8 illustrates exemplary algorithms for providing test code base automated application code generation in accordance with an exemplary embodiment.

FIG. 8 illustrates exemplary algorithms for providing test code base automated application code generation in accordance with an exemplary embodiment.

According to exemplary aspects, FIG. 8 provides two exemplary code structure for generating an application code from inputted unit tests. In the first scenario, as presented in lines 3 to 18, a unit test is provided as input and an execution context includes a class definition. In the first scenario, when the test is run in the supplied context, then the class definition is applied in the application code generation without having to separately generate the class definition. Once the application code is generated with the provided class definition, then the test may be executed on the generated application code without errors. In this scenario, an application code may be efficiently generated as only data objects, attributes, values or the like corresponding to the class definition may be generated for testing by the inputted test code. Accordingly, for at least these reasons, processing and memory resources may be conserved by selectively omitting generation of certain data scenarios that may be irrelevant to the provided class definition.

In the second scenario, as presented in lines 20 to 36, a unit test is provided as input, but no execution context is provided for providing an empty execution context. In the second scenario, when the test is run in the empty context that is supplied, then a class definition needs to be first generated before an application code may be generated and tested or verified using the test code.

Accordingly, as exemplified above, based on the supplied execution context, one or more definitions may be generated, retrieved, or derived for generating an application code from the provided test code, allowing for flexibility in code generation without requiring generation of predefined scenarios. Such features allows for more efficient utilization of memory for generation of application code as well as more efficient processor utilization as all possible scenarios are not required to be defined beforehand.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law; the scope of the present disclosure is to be determined by the broadest permissible interpretation of the following claims and their equivalents, and shall not be restricted or limited by the foregoing detailed description.

What is claimed is:

1. A method for generating an application code from an inputted test code, the method comprising:
   receiving, by a processor, one or more sets of test code;
   analyzing and parsing, by the processor, the one or more sets of test code;
   extracting, by the processor, at least one feature from the parsed one or more sets of test code;
   determining, by the processor, an execution context of the one or more sets of test code;
   determining, by the processor, whether a seed code is included in the execution context;
   when the seed code is determined to be included in the execution context, generating the application code onto the seed code;
   when the seed code is determined to be absent in the execution context, generating the application code;
   applying, by the processor, the application code onto the one or more sets of test code;
   determining whether the applying of the application code onto the one or more sets of test code results in an error or not,
   wherein a result of the determining is inputted into a machine learning model, and the machine learning model is modified based on the result of the determining for subsequent processing of the inputted test code,
   wherein the parsing includes:
      generating a syntax tree including a plurality of nodes;
      querying of the syntax tree and extracting one or more syntax nodes; and
      creating a semantics model for identification of the at least one feature, and
   when the seed code is determined to be absent in the execution context, creating a class definition by:
      creating another data structure keyed to the syntax tree;
      inserting one or more assertion attribute to the other data structure; and
      attaching an attribute list to each interface function extracted from the parsed one or more sets of test code.

2. The method according to claim 1, wherein the one or more sets of test code include at least one of a unit test code, a system test code or an integration test code.

3. The method according to claim 1, wherein the at least one feature includes an interface.

4. The method according to claim 1, wherein the seed code is the class definition.

5. The method according to claim 1,
   wherein the class definition is generated by the processor separately from the generating of the application code.

6. The method according to claim 5, wherein the application code is generated using the class definition that is generated.

7. The method according to claim 1, wherein the analyzing and parsing of the one or more sets of the test code is performed using the machine learning model.

8. The method according to claim 1, wherein the at least one feature identified includes an interface that is mocked in the one or more sets of test code.

9. The method according to claim 1, wherein the at least one feature is mocked in the one or more sets of test code.

10. The method according to claim 1, wherein the execution context indicates an inclusion of the seed code.

11. The method according to claim 1, wherein the execution context indicates an inclusion of the class definition.

12. The method according to claim 1, wherein the execution context is determined to be an empty execution context.

13. The method according to claim 1, wherein the application code to be generated is dictated by the seed code.

14. The method according to claim 1, wherein the at least one feature extracted from the one or more sets of test code is stored in a dictionary database, and
   wherein the application code is generated using the dictionary database and the machine learning model.

15. A system to provide for generating an application code from an inputted test code, the system comprising:
   a memory;
   a display; and
   a processor configured to perform:
   receiving one or more sets of test code;
   analyzing and parsing the one or more sets of test code;
   extracting at least one feature from the parsed one or more sets of test code;
   determining an execution context of the one or more sets of test code;
   determining whether a seed code is included in the execution context;
   when the seed code is determined to be included in the execution context, generating the application code onto the seed code;
   when the seed code is determined to be absent in the execution context, generating the application code;
   applying the application code onto the one or more sets of test code;
   determining whether the applying of the application code onto the one or more sets of test code results in an error or not,
   wherein a result of the determining is inputted into a machine learning model, and the machine learning model is modified based on the result of the determining for subsequent processing of the inputted test code,
   wherein the parsing includes:
      generating a syntax tree including a plurality of nodes;

querying of the syntax tree and extracting one or more syntax nodes; and creating a semantics model for identification of the at least one feature, and when the seed code is determined to be absent in the execution context, creating a class definition by:
creating another data structure keyed to the syntax tree;
inserting one or more assertion attribute to the other data structure; and
attaching an attribute list to each interface function extracted from the parsed one or more sets of test code.

16. A non-transitory computer readable storage medium that stores a computer program for generating an application code from an inputted test code, the computer program, when executed by a processor, causing a system to perform a plurality of processes comprising:

receiving one or more sets of test code;
analyzing and parsing the one or more sets of test code;
extracting at least one feature from the parsed one or more sets of test code;
determining an execution context of the one or more sets of test code;
determining whether a seed code is included in the execution context;
when the seed code is determined to be included in the execution context, generating the application code onto the seed code;
when the seed code is determined to be absent in the execution context, generating the application code;
applying the application code onto the one or more sets of test code;
determining whether the applying of the application code onto the one or more sets of test code results in an error or not,
wherein a result of the determining is inputted into a machine learning model, and the machine learning model is modified based on the result of the determining for subsequent processing of the inputted test code,
wherein the parsing includes:
generating a syntax tree including a plurality of nodes;
querying of the syntax tree and extracting one or more syntax nodes; and
creating a semantics model for identification of the at least one feature, and
when the seed code is determined to be absent in the execution context, creating a class definition by:
creating another data structure keyed to the syntax tree;
inserting one or more assertion attribute to the other data structure; and
attaching an attribute list to each interface function extracted from the parsed one or more sets of test code.

* * * * *